(12) United States Patent
Alston et al.

(10) Patent No.: US 7,797,958 B2
(45) Date of Patent: Sep. 21, 2010

(54) HVAC SYSTEM CONTROLLED BY A BATTERY MANAGEMENT SYSTEM

(75) Inventors: G. Kevin Alston, Oakland, CA (US); Machiko Taylor, Alameda, CA (US)

(73) Assignee: Glacier Bay, Inc., Union City, CA (US)

( * ) Notice: Subject to any disclaimer, the term of this patent is extended or adjusted under 35 U.S.C. 154(b) by 732 days.

(21) Appl. No.: 11/560,160

(22) Filed: Nov. 15, 2006

(65) Prior Publication Data
US 2008/0110189 A1    May 15, 2008

(51) Int. Cl.
*F25B 27/00*    (2006.01)
(52) U.S. Cl. .............................. 62/236; 62/243; 62/244; 165/43
(58) Field of Classification Search ................... 62/236, 62/243, 244; 165/42, 43, 202, 240; 701/22, 701/36; 320/134, 135
See application file for complete search history.

(56) References Cited

U.S. PATENT DOCUMENTS

| | | | |
|---|---|---|---|
| 3,844,130 A | 10/1974 | Wahnish | |
| 4,015,182 A | 3/1977 | Erdman | |
| 4,359,875 A | 11/1982 | Ohtani | |
| 4,658,593 A | 4/1987 | Stenvinkel | |
| 4,934,158 A | 6/1990 | Sakano | |
| 4,947,657 A | 8/1990 | Kalmbach | |
| 5,056,330 A | 10/1991 | Isobe et al. | |
| 5,265,435 A | 11/1993 | Richardson | |
| 5,501,267 A | 3/1996 | Iritani et al. | |
| 5,502,365 A | 3/1996 | Nanbu et al. | |
| 5,519,301 A | 5/1996 | Yoshida et al. | |
| 5,537,831 A | 7/1996 | Isaji et al. | |
| 5,562,538 A | 10/1996 | Suyama | |
| 5,664,429 A | 9/1997 | Isaji | |
| 5,867,996 A | 2/1999 | Takano et al. | |
| 5,899,081 A * | 5/1999 | Evans et al. | .................... 62/126 |
| 5,934,089 A | 8/1999 | Nakagawa et al. | |
| 6,044,651 A | 4/2000 | Reason et al. | |
| 6,048,288 A | 4/2000 | Tsujii et al. | |
| 6,073,456 A | 6/2000 | Kawai et al. | |
| 6,089,034 A | 7/2000 | Lake et al. | |
| 6,109,045 A | 8/2000 | Takenaka | |
| 6,209,331 B1 | 4/2001 | Lake et al. | |

(Continued)

FOREIGN PATENT DOCUMENTS

DE        10226089 A1    1/2003

(Continued)

OTHER PUBLICATIONS

Zhigan Wu et al., "Sensorless Brushless DC Motor Drive for Airconditioner Compressor," Electrical Machines and Systems, 2001, pp. 968-971, Fifth International Conference, vol. 2, Shanghai, China.

(Continued)

*Primary Examiner*—Cheryl J Tyler
*Assistant Examiner*—Paolo Gonzalez
(74) *Attorney, Agent, or Firm*—Foley & Lardner LLP

(57) ABSTRACT

An HVAC system for a vehicle. The HVAC system includes a battery management controller, which can be used to run the components of the HVAC system when the engine of the vehicle is not running.

19 Claims, 10 Drawing Sheets

U.S. PATENT DOCUMENTS

| | | | |
|---|---|---|---|
| 6,230,507 B1 | 5/2001 | Ban et al. | |
| 6,287,081 B1 | 9/2001 | Tamegai et al. | |
| 6,351,957 B2 | 3/2002 | Hara | |
| 6,367,270 B2 | 4/2002 | Niimi et al. | |
| 6,411,059 B2 | 6/2002 | Frugier et al. | |
| 6,470,694 B1 | 10/2002 | Buck et al. | |
| 6,513,341 B2 | 2/2003 | Nakajima | |
| 6,523,361 B2 | 2/2003 | Higashiyama | |
| 6,530,426 B1 | 3/2003 | Kishita et al. | |
| 6,532,926 B1 | 3/2003 | Kuroda et al. | |
| 6,543,243 B2 | 4/2003 | Mohrmann et al. | |
| 6,560,984 B2 | 5/2003 | Bellet | |
| 6,615,595 B2 | 9/2003 | Baruschke et al. | |
| 6,626,003 B1 | 9/2003 | Kortüm et al. | |
| 6,637,230 B2 | 10/2003 | Iwanami et al. | |
| 6,640,562 B2 | 11/2003 | Odachi et al. | |
| 6,644,055 B2 | 11/2003 | Ohta et al. | |
| 6,659,727 B2 | 12/2003 | Major et al. | |
| 6,662,580 B2 | 12/2003 | Suitou et al. | |
| 6,675,596 B2 | 1/2004 | Iwanami et al. | |
| 6,688,121 B2 | 2/2004 | Tada et al. | |
| 6,705,102 B2 | 3/2004 | Adaniya et al. | |
| 6,715,995 B2 | 4/2004 | Kelm et al. | |
| 6,737,756 B1 * | 5/2004 | Gale et al. | 290/7 |
| 6,742,350 B2 | 6/2004 | Suzuki et al. | |
| 6,745,585 B2 | 6/2004 | Kelm et al. | |
| 6,761,037 B2 | 7/2004 | Tsuboi et al. | |
| 6,801,842 B2 | 10/2004 | Egami et al. | |
| 6,830,438 B2 | 12/2004 | Iwanami et al. | |
| 6,889,512 B2 | 5/2005 | Ebara et al. | |
| 6,889,762 B2 * | 5/2005 | Zeigler et al. | 165/240 |
| 6,939,114 B2 | 9/2005 | Iwanami et al. | |
| 6,981,544 B2 | 1/2006 | Iwanami et al. | |
| 7,076,963 B2 | 7/2006 | Higashiyama | |
| 7,150,159 B1 | 12/2006 | Brummett et al. | |
| 7,278,833 B2 | 10/2007 | Higashiyama et al. | |
| 2001/0010261 A1 | 8/2001 | Oomura et al. | |
| 2002/0078700 A1 | 6/2002 | Kelm et al. | |
| 2002/0084769 A1 | 7/2002 | Iritani et al. | |
| 2002/0112489 A1 | 8/2002 | Egawa et al. | |
| 2003/0041603 A1 | 3/2003 | Tada et al. | |
| 2003/0053916 A1 | 3/2003 | Terauchi | |
| 2003/0068232 A1 | 4/2003 | Iwanami et al. | |
| 2003/0070800 A1 | 4/2003 | Ito et al. | |
| 2003/0070849 A1 | 4/2003 | Whittaker | |
| 2003/0141049 A1 | 7/2003 | Kennedy | |
| 2003/0201097 A1 | 10/2003 | Zeigler et al. | |
| 2004/0041403 A1 * | 3/2004 | Fattic | 290/38 E |
| 2005/0109499 A1 | 5/2005 | Iwanami et al. | |
| 2005/0132736 A1 | 6/2005 | Grimm et al. | |
| 2005/0285445 A1 | 12/2005 | Wruck et al. | |
| 2006/0032253 A1 | 2/2006 | Lee et al. | |
| 2006/0102333 A1 | 5/2006 | Zeigler et al. | |
| 2006/0139007 A1 * | 6/2006 | Kim | 320/134 |
| 2006/0151163 A1 | 7/2006 | Zeigler et al. | |
| 2006/0151164 A1 | 7/2006 | Zeigler et al. | |
| 2006/0248907 A1 | 11/2006 | Allen et al. | |
| 2007/0131408 A1 | 6/2007 | Zeigler et al. | |
| 2007/0186573 A1 | 8/2007 | Ziehr et al. | |
| 2007/0299560 A1 | 12/2007 | LaHue et al. | |
| 2008/0014852 A1 | 1/2008 | Mielke et al. | |
| 2008/0110189 A1 | 5/2008 | Alston et al. | |

FOREIGN PATENT DOCUMENTS

| | | |
|---|---|---|
| EP | 1 213 166 A1 | 6/2002 |
| EP | 1 213 166 B1 | 6/2002 |
| EP | 1 285 791 A1 | 2/2003 |
| EP | 1 285 791 B1 | 8/2004 |
| JP | 06106964 A | 4/1994 |
| JP | 10109531 A | 4/1998 |
| JP | 10236151 A | 9/1998 |
| JP | 10291415 A | 11/1998 |
| JP | 2000108651 A | 4/2000 |
| JP | 2002081823 A | 3/2002 |
| JP | 2003048425 A | 2/2003 |
| JP | 2003211950 A | 7/2003 |
| JP | 2004044500 A | 2/2004 |
| JP | 2005126052 A | 5/2005 |
| JP | 2007050739 A | 3/2007 |
| JP | 2007099032 A | 4/2007 |
| JP | 2007168775 A | 7/2007 |
| WO | WO 01/40005 A1 | 6/2001 |
| WO | WO 02/32706 A1 | 4/2002 |
| WO | WO 2006/024168 A1 | 3/2006 |

OTHER PUBLICATIONS

Hiroshi Murakami et al., "Highly Efficient Brushless Motor Design for an Air-conditioner of the Next Generation 42V Vehicle," Industry Applications Conference, 2001, pp. 461-466, Thirty-Sixth Annual Meeting, Osaka, Japan.

Glacier Bay Final Report/Glacier Bay Environmental Control System for Electric and Hybrid Vehicles (ECS) Final Report, Apr. 1998.

DC Airco, DC Powered Airconditioners for 12 and 24 volt cab cooling Brochure.

Sunny Airco 4400 and 9000 Brochure.

Masterflux, Masterflux Variable Speed Brushless DC Refrigeration & Air Conditioning Compressors Brochure.

* cited by examiner

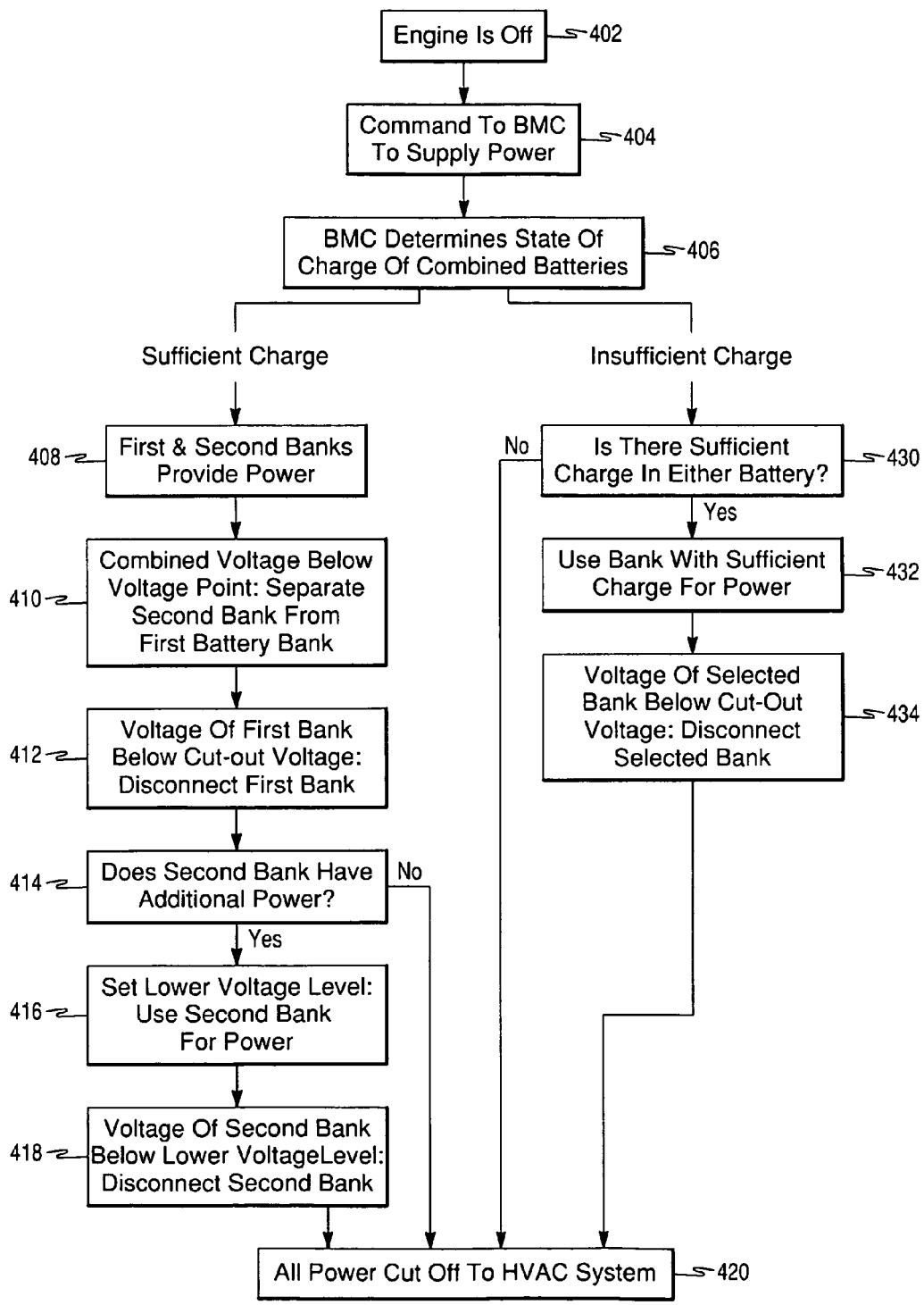

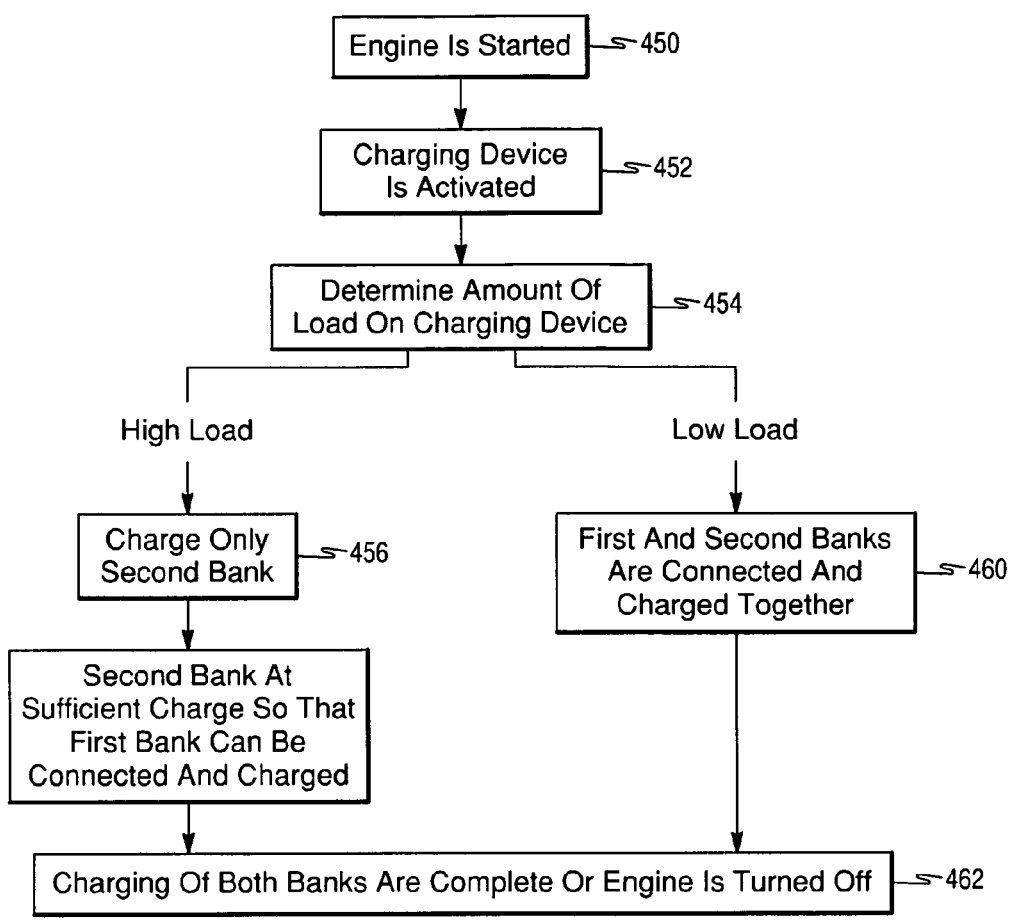

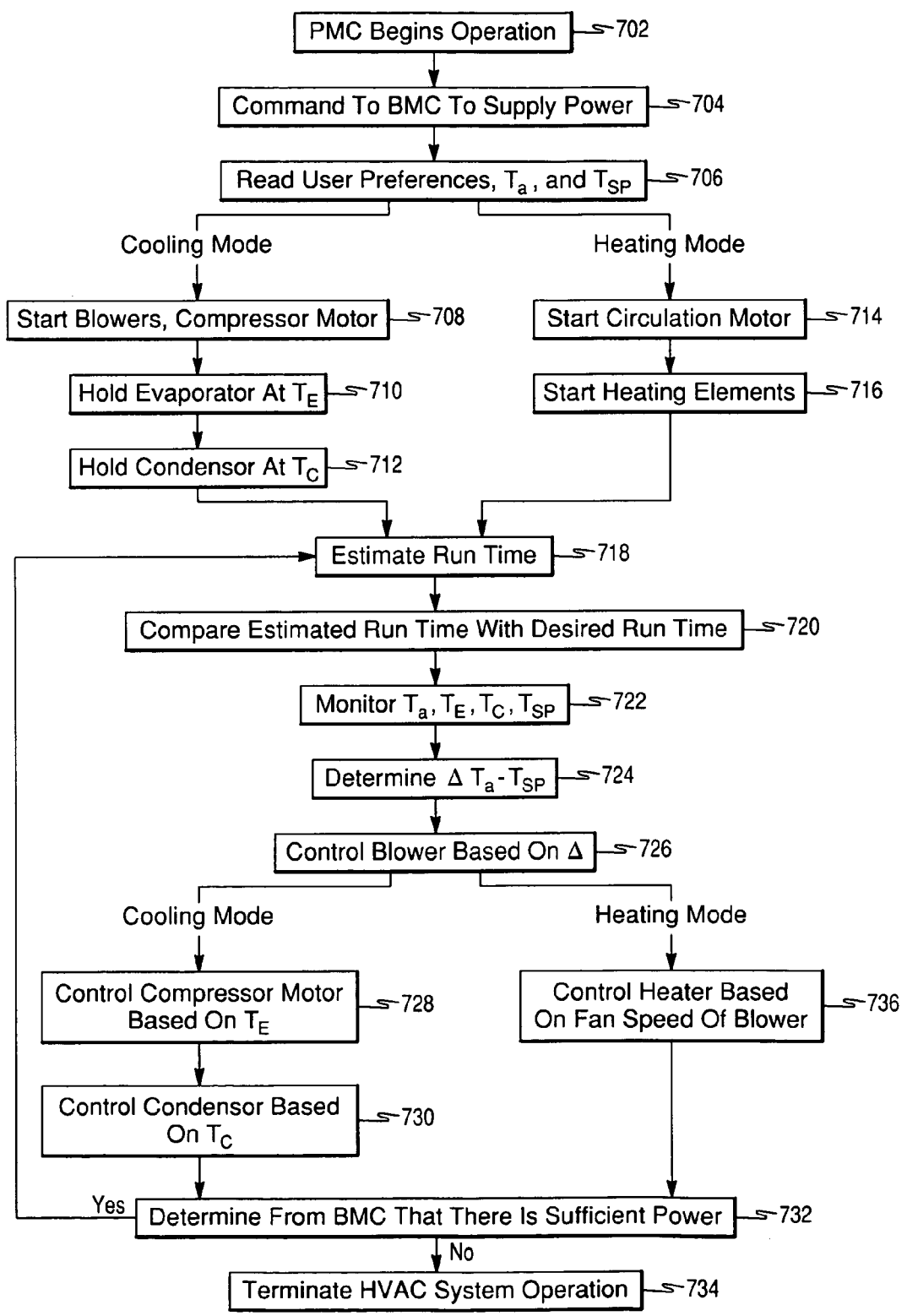

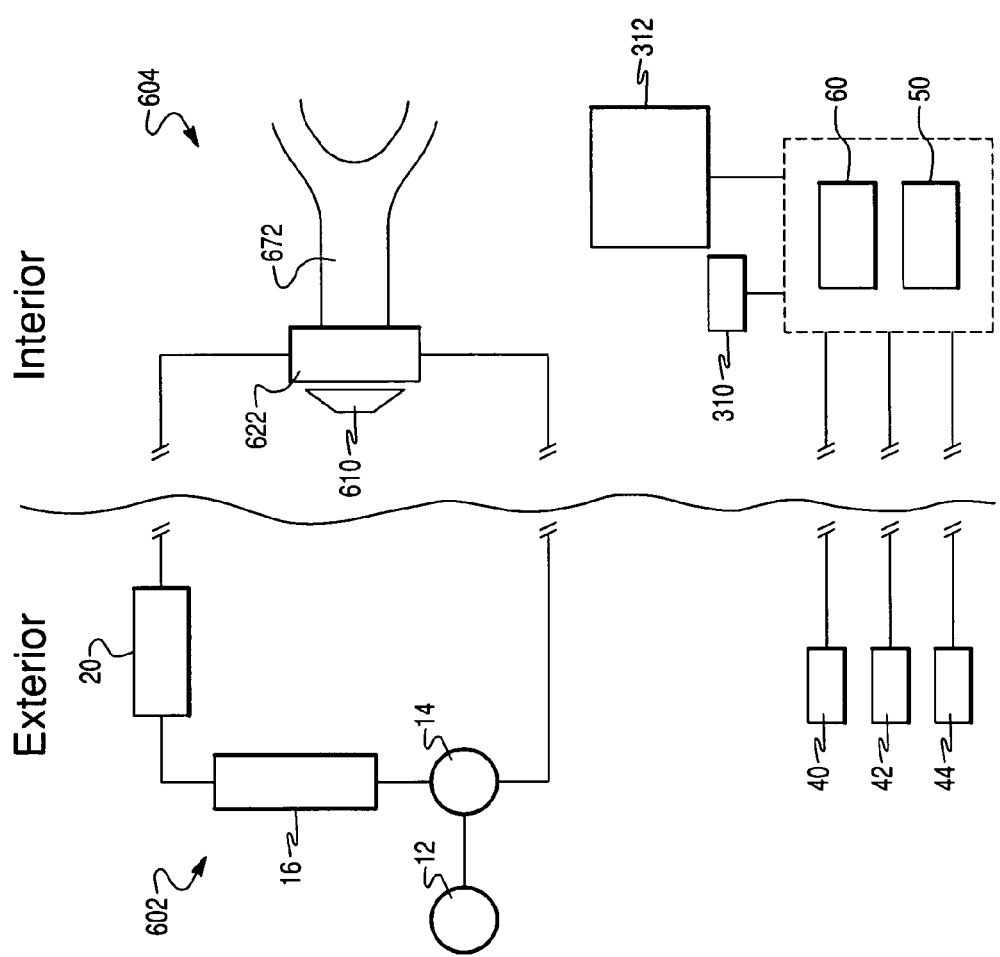

HVAC SYSTEM CONTROLLED BY A BATTERY MANAGEMENT SYSTEM

BACKGROUND

The present invention relates to a heating, ventilation, and air conditioning (HVAC) unit or system to be installed in a vehicle.

Truck drivers that move goods across the country may be required to pull over at various times along their journey so as to rest so that they do not become too fatigued. Common places for truck drivers to rest include rest stops, toll plazas, and the like. However, these locations usually do not have any accommodations for the drivers, and as a result they usually remain inside the cab of the truck inside a sleeping compartment. To provide the driver with maximum comfort, the sleeping compartment should be temperature controlled so that the environment in the truck is conducive for the driver to get the rest he or she needs.

Currently, trucks tend to use engine-belt driven compressors for the air conditioning system to circulate and pump refrigerant throughout the vehicle to cool the driving compartments. In addition, an engine-belt driven pump can circulate engine waste heat throughout the driving compartments when heating is required. Unfortunately, these systems have the drawback of not being able to operate when the engine is turned off. As a result, the driver has the choice of either keeping the engine running (which requires additional fuel) so as to run the temperature control system or turning the engine off and not using the air conditioning or heating systems (which can make the driver uncomfortable).

In view of the above, there is a need to provide an HVAC system which can provide temperature control when the engine is turned off and can provide the necessary power to the heating and cooling system. One option is to use the battery of the truck to power the HVAC system. This option has the drawback that the HVAC system may have to be turned off at a certain point so that the battery does not drain to the point that the vehicle cannot be started. Thus, there is a need to provide a battery management system that will maximize the amount of time that the HVAC system can run when the engine is turned off yet does not drain the vehicle battery such that the vehicle cannot start.

Another drawback is that heaters used in the heating system often run on diesel fuel. As previously mentioned, engine-belt driven pumps can circulate engine waste heat throughout the driving compartments for heating purposes but these pumps require fuel. Alternatively, a dedicated burner can be used which pulls fuel from the tank (when the engine is not running) and burns it to heat air directly or through circulated water. Thus, there is a need to provide a heating system in the HVAC system which is capable of running while the engine is turned off such that no diesel fuel is being expended.

Another drawback is that the replacement of an HVAC system can result in a laborious and costly installation process. For example, the replacement of an HVAC system might mean the replacement of existing and fully functional equipment that is already on the vehicle, such as replacing the evaporator, circulation fans, or ducting. Thus, there is a need to provide an HVAC system that can be easily installed and does not necessarily involve the replacement of all the existing components of a vehicle's HVAC system.

SUMMARY

According to one embodiment of the present invention, an HVAC system to be installed in a vehicle is disclosed, which comprises a battery management controller. The battery management controller can comprise at least one connection for electrically coupling a first power source with a first voltage and at least one connection for electrically coupling a second power source with a second voltage. The battery management controller can be configured to run a temperature control system and to supply power to the temperature control system from a combination of the first and second power sources with a combined voltage, wherein the second power source is disconnected when the combined voltage drops below a predetermined amount.

According to another embodiment of the present invention, an HVAC system to be installed in a vehicle is disclosed, which comprises a reverse cycle heating system and a battery management system configured to run the reversed heating system when the engine of the vehicle is turned off.

According to a further embodiment of the present invention, an HVAC to be installed in a vehicle is disclosed, which comprises a first power source; a compressor; a motor operatively coupled to the compressor; a condenser; and a battery management system configured to run the motor when the engine of the vehicle is turned off. The first power source, the compressor, the motor, and the condenser can be configured to be outside a cab of the vehicle as an exterior subsystem.

It is to be understood that both the foregoing general description and the following detailed description are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

FIGS. 6(a) and 6(b) are flow charts showing the operation of the battery management controller during the discharging and recharging of the power sources, respectively, according to an embodiment of the present invention.

FIG. 7 is a flow chart showing the operation of the power management controller according to an embodiment of the present invention.

FIG. 8 is a schematic diagram of an HVAC system to be installed in a vehicle according to an embodiment of the present invention.

DETAILED DESCRIPTION

Hereinafter, various embodiments of the present invention will be described in detail with reference to the drawings.

Figure 1:
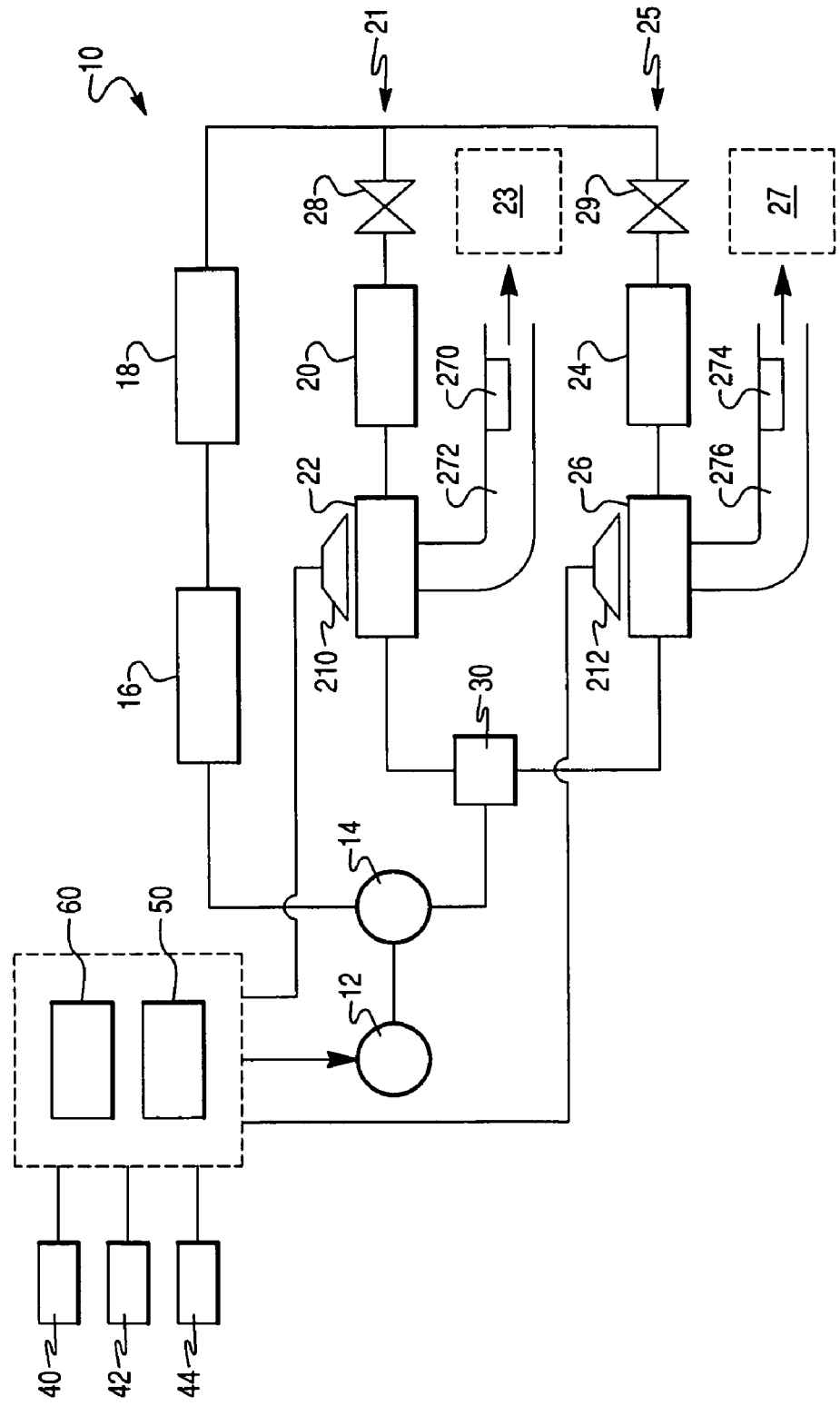
FIG. 1 is a schematic diagram of an HVAC system to be installed in a vehicle according to an embodiment of the present invention.

FIG. 1 is a schematic diagram of an HVAC system to be installed in a vehicle according to an embodiment of the present invention. The HVAC system 10 may comprise a motor 12, a compressor 14, circulation blowers 210 and 212, a power management controller 50, and a battery management controller 60. The motor can be operatively coupled to the compressor 14. The compressor 14 is a stepless continuously variable speed compressor, which is driven by the motor 12. The compressor 14 circulates refrigerant through the condenser 16 to an optional refrigerant receiver and dryer 18. From the refrigerant receiver and dryer 18, the refrigerant then passes to either a first cooling path 21 that cools the driving compartment 23 or a second cooling path 25 that cools the sleeping compartment 27 of the vehicle. As to the first cooling path 21, the refrigerant passes through a refrigerant metering device 20 and an evaporator 22. The refrigerant metering device 20 may or may not be an expansion device, such as a thermostatic expansion valve, a pressure control expansion valve, a capillary tube, or the like, used in the conventional way. In one arrangement, the refrigerant metering device 20 is a metering device feeding refrigerant into the flooded evaporator 22 with no expansion taking place at or near the refrigerant metering device 20, and thus merely meters in liquid refrigerant at a rate sufficient to maintain the correct liquid level in the evaporator. Air is blown over the evaporator 22 by the circulation blower 210. After the air is cooled by the evaporator 22, the air proceeds through an air duct 272 towards the driving compartment 23 of the vehicle.

A second cooling path 25 runs parallel to the first cooling path 21 in which the refrigerant is provided through a refrigerant metering device 24 and an evaporator 26. Air is blown over the evaporator 26 by a circulation blower 212. After the air is cooled by the evaporator 26, the air proceeds through an air duct 276 towards the sleeping compartment 27 of the vehicle. The evaporator 26 of the second cooling path 25 can be smaller than the evaporator 22 of the first cooling path 21 because the sleeping compartment 27 is typically smaller than the driving compartment 23.

The two coolant loops may be selectable through the use of valves 28 and 29. The inclusion of such valves permits the driving compartment 23, the sleeping compartment 27, or both compartments to be air conditioned at a particular time. The valves 28 and 29 can be controlled through the power management controller 50 (to be discussed below). Once the refrigerant passes through the evaporator 22 and/or 26, the refrigerant then passes through an optional refrigerant accumulator 30 before being returned to the compressor 14 to restart the process.

The motor 12 can be any suitable motor. For example, the motor 12 can be a brushless DC motor that is commutated by a square or trapezoidal wave form. In another example, the motor 12 can be a synchronous permanent magnet motor that is commutated with a sine wave. When the motor is driven by a sine wave, additional benefits can be obtained, such as better drive efficiency, better cooling and quieter operation.

By using a variable speed compressor 14 driven by a brushless DC or a synchronous permanent magnet motor 12, the vehicle's HVAC system may be operated when the engine is turned on or when the engine is turned off. The variable speed compressor 14 also can permit the HVAC system 10 to operate at a lower capacity during the engine off operation to conserve the amount of stored energy available for usage by the system 10. The control for this operation is provided by a power management controller 50 that monitors various system parameters while the battery management controller 60 monitors the availability and status of the power sources on the vehicle. The available power sources can include a first power source 40, a second power source 42, and/or the vehicle's main electrical power generation system 44.

In a similar manner, the circulation blowers 210 and 212 can also have stepless continuously variable speeds such that the circulation blowers can operate at a lower capacity during the engine off operation to conserve the amount of stored energy available for usage by the HVAC system 10. The control for this operation is also provided by the power management controller 50.

The battery management controller 60 is configured such that the vehicle's HVAC system 10 is capable of being powered by the vehicle's main electrical power generation system 44, which is available while the vehicle's engine is operating. When the vehicle's engine is off, the HVAC system 10 can be powered with a first power source 40 and/or a second power source 42 depending on the power levels of the power sources (as will be described later). In one embodiment, the first power source 40 can be one or more auxiliary deep-cycle batteries and the second power source 42 can be the vehicle's one or more starter batteries. In another embodiment, one of the first and second power sources may be an external source of AC power connected to the system through an external connection.

In the HVAC system 10, the motor driven compressor 14 can have the ability to modulate its output from full capacity to low capacity. This ability to modulate allows the use of a single HVAC system that can be used for both high output for the time periods that the engine is operating, and low output during the time periods when the engine is turned off so as to continue to cool or heat the driving and/or sleeping compartments. The coordination of this modulation is provided by the power management controller 50, which reduces the speed of the compressor when the engine is turned off. This modulation extends the duration of the heating and cooling operations because the charge of the available power sources is expended more slowly. That is, with a reduced speed of the compressor, the electric power demand is reduced as well.

Another aspect of FIG. 1 is a heating mode of operation in which there is an air heater in each air duct that leads to the vehicle compartments. For example, the air heater 270 is disposed in the air duct 272 which leads to the driving compartment 23. The air heater 274 is disposed in the air duct 276 which leads to the sleeping compartment 27. The air heaters 270 and 274 may be any heater known in the art, such as an electric resistance-type heater. The advantage of using an electric resistance-type heater is that such a heater allows the heating function to be completed without relying on the engine or additional fuel by merely relying on the circulation blowers and the heaters, which are powered by the first and/or second power sources or the vehicle electrical power generation system. In a preferred embodiment, instead of the air ducts 272 and 276, the air heaters 270 and 274 can be placed within the same enclosures as the circulation blowers 210 and 212 but still in the path of the gas stream which enters the vehicle and/or sleeping compartments. If the air heaters are in the same enclosures as the circulation blowers, there can be a reduction in the complexity of the installation.

To operate in the heating mode, the power management controller 50 does not operate the compressor 14 but merely operates the circulation blower 210 and the air heater 270 to provide the necessary heating to the driving compartment and/or the circulation blower 212 and the air heater 274 to provide the necessary heating to the sleeping compartment.

This configuration provides additional power consumption savings and allows for a longer operating duration in the heating mode. In the cooling mode of operation, the air heaters 270 and 274 are simply not activated. If temperature control is desired, the power management controller 50 can preferably provide pulse width modulation control (PWM) of power to the air heaters 270 and 274. Alternatively, temperature control can be performed by a control door known in the art (not shown) placed in each duct (if provided) to control the flow of air (which may or may not be cooled by the evaporators 22 and/or 26) passing over the air heaters 270 and/or 274 to regulate the temperature of the air flowing into their respective vehicle compartments.

The embodiment of FIG. 1 can include alternative configurations. For example, the first or second cooling path can be eliminated such that there is only one expansion device, one evaporator, one blower, and no accumulator 30. With this configuration only one vehicle compartment can be temperature controlled. Alternatively, ducting can be used to channel the temperature controlled air into separate channels in which a first channel goes to the driving compartment and a second channel goes to the sleeping compartment. In this embodiment, a control door or the like can be used to channel the temperature controlled air to one compartment to the exclusion of the other.

Figure 2:
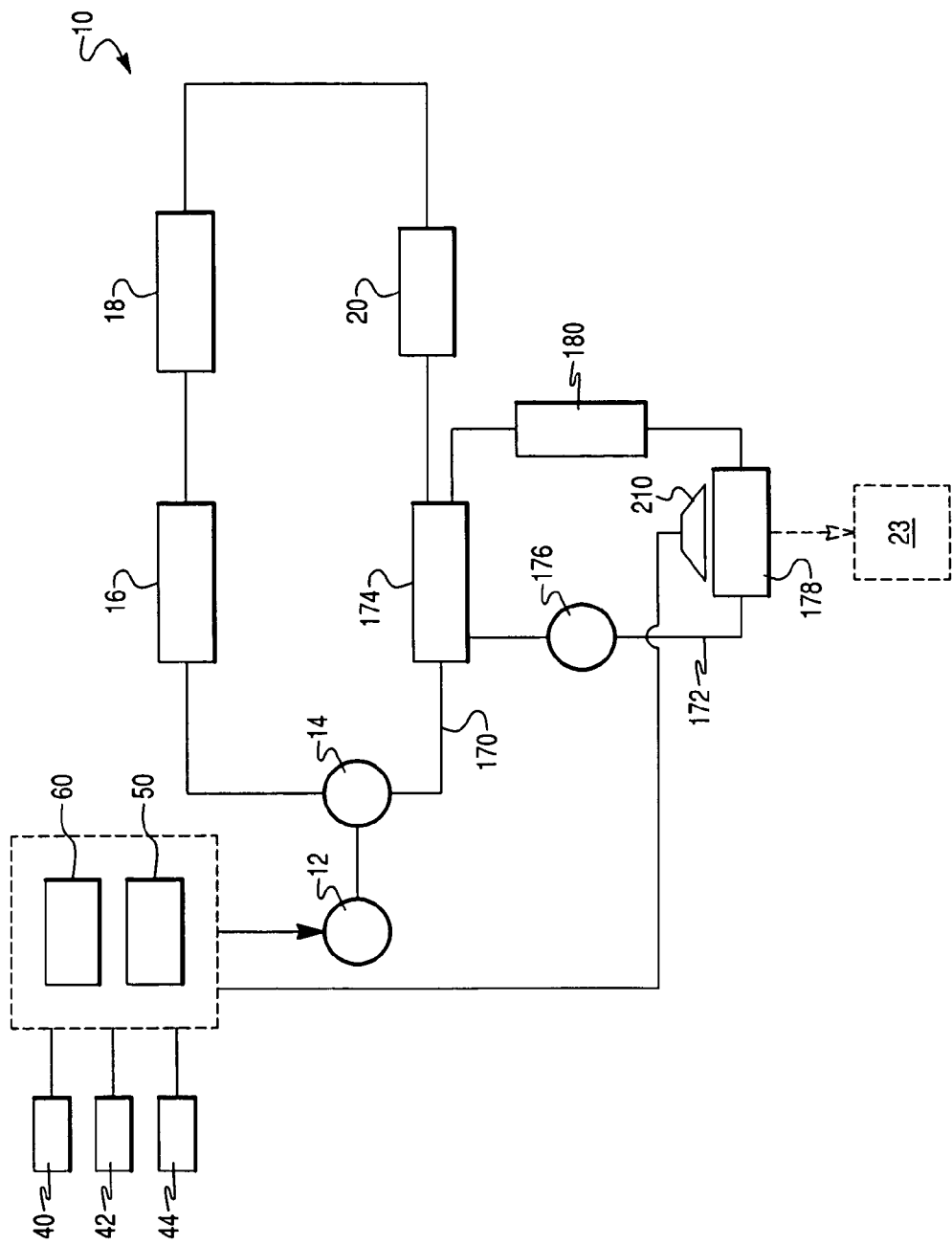
FIG. 2 is a schematic diagram of an HVAC system according to another embodiment of the present invention.

FIG. 2 is a schematic diagram of another embodiment of the HVAC system 10 according to another embodiment of the present invention. The HVAC system 10 of this embodiment includes a primary coolant loop 170 that includes a first refrigerant and a secondary coolant loop 172 that includes a second refrigerant. The first refrigerant in the primary coolant loop 170 is driven by the compressor 14 which passes through the condenser 16, the receiver and dryer 18, the refrigerant metering device 20, the first refrigerant-to-second refrigerant heat exchanger 174, and back to the compressor 14.

In contrast, the second refrigerant in the secondary coolant loop 172 is driven by a low pressure liquid pump 176. The fluid passes through a second refrigerant-to-air heat exchanger 178, a heater 180, and the first refrigerant-to-second refrigerant heat exchanger 174. The first refrigerant-to-second refrigerant heat exchanger 174 serves as the heat exchange medium between the primary coolant loop 170 and the secondary coolant loop 172. The second refrigerant-to-air heat exchanger 178 cools the air supplied by the circulation blower 210, which then flows to the vehicle compartment with or without ducting. To provide heating of the vehicle compartment, the power management controller 50 need only operate the low pressure liquid pump 176 and the heater 180 in the secondary coolant loop 172 and the circulation blower 210. That is, no power is delivered to the compressor 14, and as a result the amount of power consumption is further reduced, which extends the time duration that heating can take place.

Figure 3:
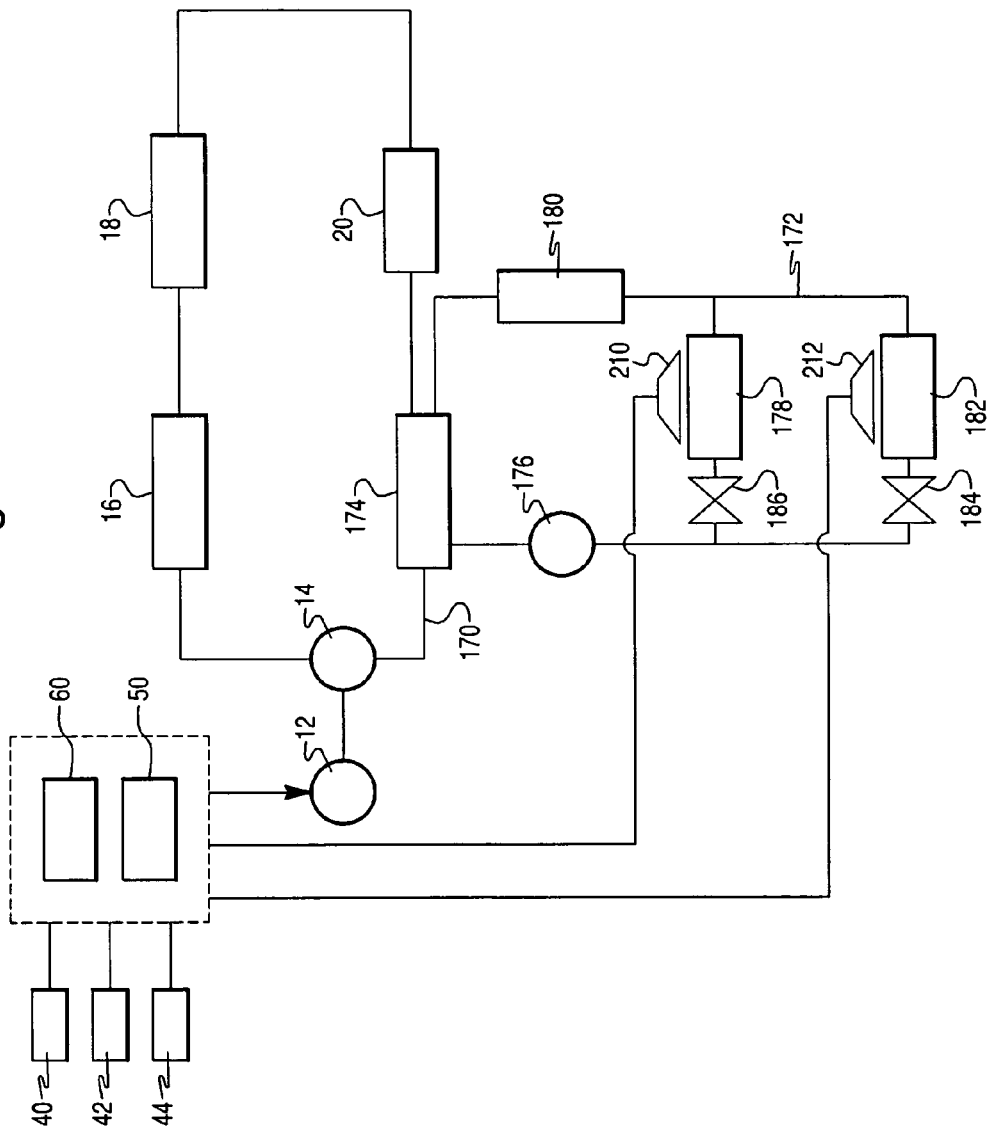
FIG. 3 is a schematic diagram of an alternative configuration of the HVAC system of FIG. 2 according to an embodiment of the present invention.

FIG. 3 shows an alternative configuration of FIG. 2 in which there are two second refrigerant-to-air heat exchangers 178 and 182 in the secondary coolant loop 172. One second refrigerant-to-air heat exchanger 178 can be used to provide cooling/heating to the driving compartment 23 while the other heat exchanger 180 can be used to provide cooling/heating to the sleeping compartment 27 with or without ducting. The passage of the liquid through either or both of the heat exchangers 178 and 182 can be selected by the power management controller 50, which, in turn, controls the valve 184 that leads to the heat exchanger 180 and the valve 186 that leads to the heat exchanger 178. Thus, the control of the valves 184 and 186 permits the driving compartment 23, the sleeping compartment 25, or both compartments to be air conditioned or heated at a particular time.

Figure 4:
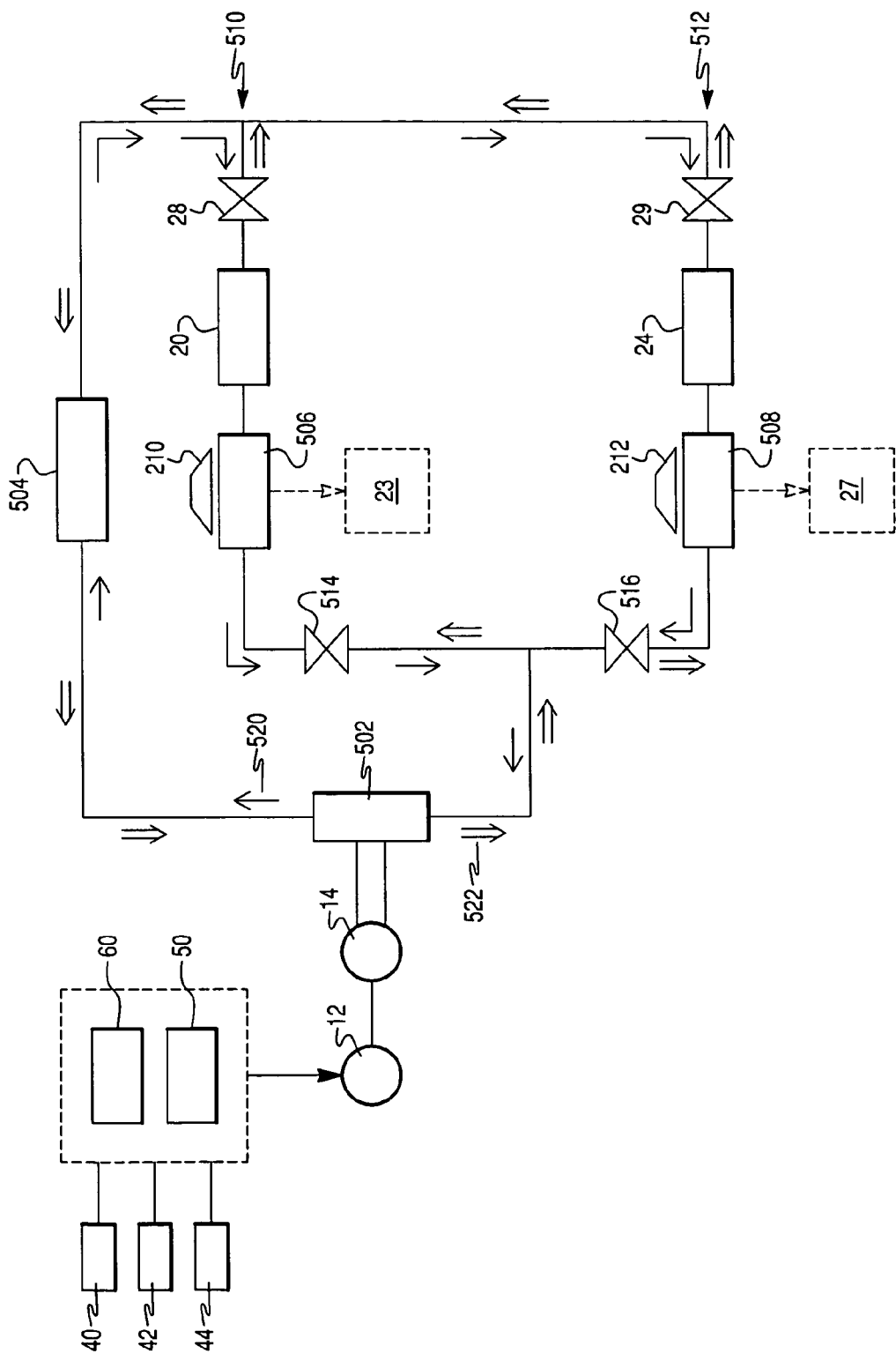
FIG. 4 is a schematic diagram of an HVAC system according to another embodiment of the present invention.

FIG. 4 shows another embodiment of the present invention in which the HVAC system uses a reverse cycle heating system. The reverse cycle heating system also allows the heating function to be completed without relying on the engine or additional fuel by merely relying on the compressor and the circulation blowers, which are powered by the first and/or second power sources or the vehicle electrical power generation system. As with the embodiment shown in FIG. 1, the HVAC system 10 of FIG. 4 may comprise a motor 12, a compressor 14, circulation blowers 210 and 212, a power management system 50, and a battery management system 60. The motor can be a brushless DC or a synchronous permanent magnet motor, which is operatively coupled to the compressor 14. The compressor 14 is a continuously variable speed compressor, which is driven by the motor 12. Connected to the compressor is a reversing valve 502, which allows the compressor to pump refrigerant in a cooling direction indicated by single arrows 520 or a heating direction indicated by double arrows 522.

As to the cooling direction, the compressor 14 circulates refrigerant through a heat exchanger 504 (which functions as a condenser in the cooling mode as the hot compressed gas from the compressor condenses to a liquid as heat is given off) to a first flow path 510 that thermally treats air going to the driving compartment 23 and/or a second flow path 512 that thermally treats air going to the sleeping compartment 27 of the vehicle. As to the first flow path 510, the refrigerant passes through a refrigerant metering device 20 and a heat exchanger 506 (which functions as an evaporator in the cooling mode as the liquid refrigerant boils and forms a gas as heat is absorbed by the refrigerant liquid). Air is blown over the heat exchanger 506 by the circulation blower 210. After the air is cooled by the heat exchanger 506, the air proceeds towards the driving compartment 23 of the vehicle.

A second flow path 512 runs parallel to the first flow path 510 in which the refrigerant is provided through a refrigerant metering device 24 and a heat exchanger 508 (which functions as an evaporator during the cooling mode as the liquid refrigerant boils and forms a gas as heat is absorbed by the refrigerant liquid). Air is blown over the heat exchanger 508 by a circulation blower 212. After the air is cooled by the heat exchanger 508, the air proceeds towards the sleeping compartment 27 of the vehicle. The heat exchanger 508 of the second flow path 512 can be smaller than the heat exchanger 506 of the first flow path 510 because the sleeping compartment 27 is typically smaller than the driving compartment 23.

The two coolant loops may be selectable through the use of valves 28, 29, 514, and 516. The inclusion of such valves permits the driving compartment 23, the sleeping compartment 25, or both compartments to be air conditioned at a particular time. The valves 28 and 514 are opened and the valves 29 and 516 are closed when only the driving compartment is being temperature controlled. By a similar token the valves 29 and 516 are opened and the valves 28 and 514 are closed when only the sleeping compartment is being temperature controlled. The valves 28, 29, 514, and 516 can be controlled through the power management controller 50. Once the refrigerant passes through the heat exchanger 506 and/or 508, the refrigerant then returns to the reversing valve 502 and the compressor 14 to restart the process.

As to the heating direction, the reversing valve 502 is switched such that the refrigerant pumped by the compressor flows in the reverse direction as indicated by double arrows 522. Thus, the compressor causes the refrigerant to flow through the first flow path 510 and/or the second flow path 512 depending if the valves 28 and 514 and the valves 29 and 516 are opened or closed. If the valves 28 and 514 are opened, the refrigerant flows through the heat exchanger 506 (which functions as a condenser in the heating mode as the hot gas is condensed to a liquid as it gives up heat). Air is blown over the heat exchanger 506 by the circulation blower 210. After the air is heated by the heat exchanger 506, the air proceeds towards the driving compartment 23 of the vehicle. Meanwhile, the refrigerant continues from the heat exchanger 506 through the refrigerant metering device 20 to the heat exchanger 504 (which functions as an evaporator in the heating mode). After flowing through the heat exchanger 504, the refrigerant returns to the reversing valve 502 and the compressor 14.

If the valves 29 and 516 are opened, the refrigerant flows through the heat exchanger 508 (which functions as a condenser in the heating mode). Air is blown over the heat exchanger 508 by a circulation blower 212. After the air is heated by the heat exchanger 508, the air proceeds towards the sleeping compartment 27 of the vehicle. Meanwhile, the refrigerant continues from the heat exchanger 506 through the refrigerant metering device 24 to the heat exchanger 504 (which functions as an evaporator in the heating mode). After flowing through the heat exchanger 504, the refrigerant returns to the reversing valve 502 and the compressor 14 to restart the process.

Similar to the embodiment shown in FIG. 1, the embodiment of FIG. 4 can include a variable speed compressor 14 driven by a brushless DC or a synchronous permanent magnet motor 12; the control for the heating and cooling operations being provided by the power management controller 50; the available power sources can include a first power source 40, a second power source 42, and/or the vehicle's main electrical power generation system 44; the circulation blowers 210 and 212 can also have continuously variable speed which can be controlled by the power management controller 50; and the battery management controller 50 can monitor and control the available power sources when the engine is turned off.

Also as with the embodiment of FIG. 1, FIG. 4 can include alternative configurations. For example, the first or the second cooling path can be eliminated such that there is only one refrigerant metering device, one heat exchanger in which air passes over, and one blower. With this configuration only one vehicle compartment can be temperature controlled. Alternatively, ducting can be used in which the duct channeling the temperature controlled air can be spit into multiple channels such that a first channel goes to the driving compartment and a second channel goes to the sleeping compartment. In this embodiment, a control door or the like can be used to channel the temperature controlled air to one compartment to the exclusion of the other.

The power requirements and operation of the HVAC system 10 are handled by the battery management controller 60 and the power management controller 50, respectively. The two controllers 50 and 60 can be software control loops with associated hardware or circuitry, and they may be physically housed in separate devices or the same device.

Figure 5A:
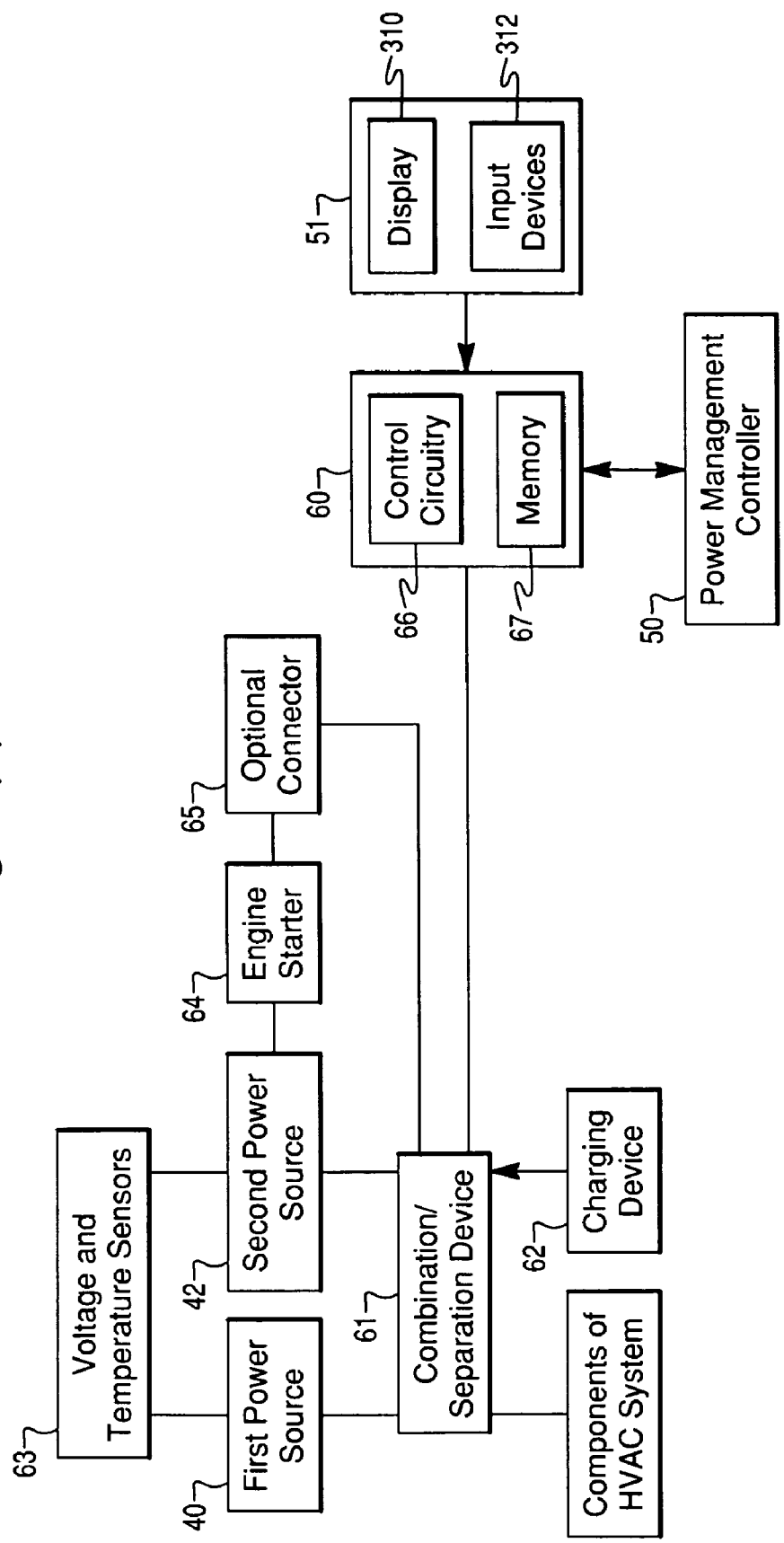
FIGS. 5(a) and 5(b) are schematic diagrams of the battery management controller and the power management controller, respectively, according to an embodiment of the present invention.

The battery management controller 60 will now be discussed with reference to FIG. 5(a). The battery management controller 60 can fulfill a variety of different purposes including: (1) maximizing the electrical power available for use by the HVAC system; (2) ensuring that sufficient electrical reserve power is available to start the engine; (3) tracking historical use (charge and discharge) of all connected batteries; (4) determining the current state of charge of all connected batteries; (5) determining the current end-of-life status of all connected batteries irrespective of their respective charge level; (6) ensuring that the charge and discharge cycles of all connected batteries are consistent with the user's preferred compromise between battery longevity and available stored energy; and (7) prevent overloading of the battery charging system.

The battery management controller 60 carries out its function by being connected to a plurality of power sources 40 and 42, a combination/separation device 61, and a charging device 61. In one exemplary embodiment, a truck can have seven batteries in which four batteries are connected in parallel to provide a high capacity first battery bank as the first power source 40 and the three remaining batteries are connected in parallel to provide a second, somewhat smaller battery bank as the second power source 42.

The first power source 40 and/or the second power source 42 are connected to a separation device 61, temperature and voltage sensors 63, and an engine starter 64. The first and second power sources (e.g., the first and second battery banks) are connected to the combination/separation device 61 so as to allow the first and second power sources to be electrically combined or separated.

The combination/separation device 61 can be electrically connected to supply power to the individual components of the HVAC system 10 and can optionally be connected to other electrical power accessories, such as microwave ovens, televisions, stereos, refrigerators, etc. The combination/separation device 61 is configured to electrically split and combine multiple power sources so as to maximize the availability of power to the components of the HVAC system 10 and the engine starter 64. Furthermore, the combination/separation device 61 can electrically split and combine multiple batteries to prevent overloading of a charging device 62, such as an alternator, by selectively combining the discharged power sources into a partially charged pack.

The temperature and voltage sensors 63 can monitor the voltage and temperatures of the first and second power sources 40 and 42. These sensors can be used to monitor the state of charge of the power sources so as to prevent the power sources from being overly discharged.

The engine starter is connected to one of the power sources so as to provide enough power to start the engine of the vehicle. The engine starter 64 can be electrically connected to the first power source or the second power sources but not to both. Also, the engine starter 64 may have an optional connection 65 that leads directly to the combination/separation device 61.

The charging device 62 can be connected to the combination/separation device 61 so that the electrical power output from the charging device 62 can be selectively routed to any individual or combination of connected power sources. The charging device can comprise one or more of the following: the engine alternator, an accessory generator, a show power connection, and other charging devices.

The battery management controller 60 can include a control logic circuit 66 and a memory 67, and can be connected to the voltage and temperature sensors 63, a user interface 51 (which can comprise a display 310 and one or more input devices 312), the combination/separation device 61, and the power management controller 50. Thus, the battery management controller 60 can receive measurements from the voltage and temperature sensors 63 and user preferences from the user interface 51. Additionally the battery management controller 60 can receive and transmit information in a bi-directional manner to and from the power management controller 50. The battery management controller 60 is used to regulate the degree of discharge among the power sources so as to conform to the user preferred compromise between the daily battery performance and the ultimate life of the power sources. In addition, the memory 67 of the battery management controller can be used to log historical data obtained during previous charge and discharge cycles, such as voltage and temperature levels, and use the historical data to modify the permitted depth of discharge to ensure the completeness of future charge cycles.

In a more conventional HVAC system, the measurement of the battery voltage under load is used to determine the state-of-charge. While this method is low in cost and easy to implement, it is also highly inaccurate. The voltage can be used to accurately determine the state-of-charge but only when such measurements are taken in conjunction with temperature and only after the battery has been "at rest" (i.e., unloaded) for a period or time (typically over one hour). In contrast, the battery management controller 60 of FIG. 5(*a*) can use multiple sources of historical and real-time data to more accurately determine the amount of stored energy available for use. Additionally, the battery management controller 60 allows a highly accurate "resting voltage" measurement of the state of charge to be made of the power reserve even when portions of the battery power supply are still in use. Below is a discussion of the processes that occur during the discharging of the power sources when in the engine is turned off, the starting up of the engine, and the charging of the power sources when the engine is turned on. In the discussion below, the first and second power sources are battery banks but is should be recognized that any type of power source can be used. For example, one of the first and second power sources may be an external AC connection.

The process that the battery management control circuit undergoes during discharge is provided in FIG. 6(*a*). The discharging of the first and/or second battery banks occurs when the engine is turned off as shown in step 402, and a command is issued from the power management controller 50 ("PMC") to the battery management controller 60 ("BMC") to supply power to the components of the HVAC system 10 as shown in step 404. In step 406, upon receiving the command from the power management controller 50, the battery management controller 60 through its control circuit 66 would determine the state of charge of the combination of the first and second battery banks by comparing the current voltage and temperature of the combined banks from data received by the voltage and temperature sensors 63 with the historical data stored in the memory 67 of the controller 60. If there is sufficient charge with both power sources, the process proceeds to step 408. If there is not sufficient charge, the process proceeds to step 430.

At step 408, upon determining that sufficient stored energy was available for use, the first and second battery banks 40 and 42 would be electrically combined through the combination/separation device 61 so as to supply power to the components of the HVAC system 10. The power draw (current) from the HVAC system 10 is monitored and the rate of decline in the combined battery banks 40 and 42 is noted. The power draw and rate of decline is compared to historical data to determine the approximate state of sulfation of the battery plates and from this comparison, the approximate condition of the batteries is deduced. Under a given load, the voltage of batteries in poor condition will decline faster than batteries in good condition. Consequently, it can be predicted that batteries in poor condition will have less total stored energy even though the actual voltage at any given time may be the same. In one example, data can be collected related to the maximum battery discharge and/or the average battery discharge during an operation cycle of the power sources when the power sources are batteries. This data can be compiled over time such that a history of the maximum and/or average battery discharge is stored in the memory 67 in the battery management controller 60.

As the voltage of the combined batteries falls, the battery management controller logic circuit 66 will use the temperature, the load, the rate of voltage change, the estimated battery condition, the stored historical data and the user preference inputted from the user interface 51 to determine the preferred voltage point at which to separate the first and second battery bank 40 and 44 using the combination/separation device 61. The user interface can comprise a display 310 and one or more input devices 312, such as a keyboard, a control panel, or the like, so that the vehicle occupant can input user preferences for the operation of the HVAC system 10. For example, the user preferences can include the operating mode of the HVAC system such as off, heating, and cooling modes of operation.

The user preferences which are inputted using the user interface 51 are also those factors that influence the extent to which the battery banks 40 and 42 will be allowed to be discharged. One example is the battery replacement life. Battery replacement life is related to the depth of the discharge of the power source as well as the rate of discharge, i.e., a function of the minimum battery voltage adjusted by the load. For example, a lightly loaded battery which is consistently discharged to 11.8 V may only last through 100 charge/recharge cycles while a heavily loaded battery that was consistently discharged to 11.8 V might last 200 charge/recharge cycles. If a user preference is set for a long battery life, the batteries will be less deeply discharged and will last longer. However, because less stored energy will be available for use, more batteries will need to be carried to supply a given amount of cooling or heating than would be the case if a shorter battery life (and more deeply discharged batteries) were selected.

In addition, the display 310 of the user interface 51 can provide a user, such as a vehicle occupant, information related to the status of the HVAC system 10. The display can include one or more of an alphanumerical display, a graph, or the like. For example, the display can include the vehicle's interior ambient temperature, the exterior ambient temperature, the circulation blower speeds, the usage of the power source or sources supplied to the HVAC system 10, and warning messages, etc. In one example, if the first power source and the second power source are batteries, the display can show the current approximate battery charges for each power source to the vehicle occupant.

As the HVAC operation continues, the combined battery bank voltage can be continually monitored. The preferred voltage point is determined based on the temperature, the load, the rate of voltage change, the estimated battery condition, the stored historical data and user preferences such that the preferred voltage point becomes a predetermined amount of voltage that is dynamically determined based on ambient operating conditions in which the first and second power sources separate if the combined voltage drops below the predetermined amount. If the voltage does not drop below the preferred voltage point, the monitoring of the power draw and rate of decline is continued. If the combined bank voltage eventually falls to the preferred voltage point, the battery management controller logic circuit 66 commands the combination/separation device 61 to electrically separate the first and second battery banks 40 and 42 at step 410. Once separated, the HVAC power is supplied solely by the first battery bank 40 while the second bank (i.e., the battery bank connected to the engine starter 64) is isolated and the voltage of the second battery bank partially recovers to an unloaded resting state. In time it will be possible to use this "resting" voltage to accurately determine the state of charge of the isolated bank. Then, a determination will then be made by the control logic circuit 66 about whether additional power can be safely drawn from the isolated bank.

With continued operation of the HVAC system 10, the voltage of first battery bank 40 continues to decline. The battery management controller logic circuit re-analyzes the battery bank 40 by comparing real time data on the power draw, the temperature and the rate of voltage decline with the stored historical data and the user input preferences to determine the amount of stored energy available. A determination is made of the minimum system disconnect voltage, i.e., the battery cut-out voltage. From this determination, a calculation is made of the estimated time to battery depletion for the first battery and this estimated time information is communicated to the power management controller 50. Because the estimated time information is based on both static data (such as historical and user input) and real-time data (such as current voltage levels and temperatures), a change in the performance, the system load or the ambient conditions during the operation of the HVAC system 10 can change the estimated time information which may increase or decrease the calculation of the available system run time.

As the HVAC system 10 continues to run, the voltage level of the first battery is monitored in step 410. As long as there is sufficient voltage, the battery management controller will continue to have the first battery bank power the HVAC components and monitor the first battery bank's voltage level. However, the power can eventually be depleted from the first battery bank 40 to the point where the voltage falls to the level calculated by the control logic circuit to be the minimum allowed, i.e., the battery cut-out voltage, and disconnect the first battery bank 40 as shown in step 412. If continued operation of the HVAC system 10 is desired, the battery management controller logic circuit 66 will use the resting voltage measurement of the second battery bank 42 (which has been isolated) to determine how much, if any, additional power can safely be drawn from that bank at step 414. If power is available from the second battery bank (the "YES" path), the control logic circuit 66 will set a second lower voltage level at step 416 and command the combination/separation device 61 to re-route power from the second battery bank 42. As the HVAC system 10 continues to run, the voltage level of the second battery is monitored. If the voltage level remains above the second voltage, the process remains at step 416. Power will then continue to be supplied by the second bank 42 until such time as the voltage of the second bank 42 falls below the second lower voltage. At that time, the battery management controller logic circuit will command the combination/separation device 61 to cut off all power to the HVAC system 10 at step 420. However, if no additional power is available from the second bank 42, the battery management controller logic circuit will just command the combination/separation device 61 to cut off all power to the HVAC system 10 at step 420.

In contrast, if there is insufficient charge in both battery banks at step 406, the battery management controller determines if there is sufficient charge in one of the battery banks at step 430. If there is not sufficient charge in either battery bank (the "NO" path), the battery management controller logic circuit will command the combination/separation device 61 to cut off all power to the HVAC system 10 at step 430. If there is sufficient charge in one of the battery banks (the "YES" path), the particular battery bank with sufficient charge would supply power to the components of the HVAC system 10 at step 432. The battery management controller logic circuit analyzes the selected battery bank by comparing real time data on the power draw, the temperature and the rate of voltage decline with the stored historical data and the user input preferences to determine the amount of stored energy available. A determination is made of the minimum system disconnect voltage, i.e., the battery cut-out voltage. From this determination, a calculation is made of the estimated time to battery depletion for the selected battery and this estimated time information is communicated to the power management controller 50. Because the estimated time information is based on both static data (such as historical and user input) and real-time data (such as current voltage levels and temperatures), a change in the performance, the system load or the ambient conditions during operation of the HVAC system 10 can change the estimated time information which may increase or decrease the calculation of the available system run time.

As the HVAC system 10 continues to run, the voltage level of the selected battery bank is monitored. If there is sufficient voltage, the battery management controller will continue the monitoring process. However, the power can eventually be depleted from the selected battery bank to the point where the voltage falls to the level calculated by the control logic circuit to be the minimum allowed, i.e., the battery cut-out voltage. Once the voltage level falls below this minimum, the battery management controller logic circuit will command the combination/separation device 61 to disconnect the selected battery bank at step 434; thus cutting off all power to the HVAC system 10 at step 420.

At the end of the discharge cycle, the battery management controller 60 has regulated the battery banks 40 and 42 so that the first battery bank 40 is more deeply discharged than the second bank 42. Additional power has been reserved in the second battery bank 42, which is the bank to which the engine starter 64 is connected, thus ensuring that sufficient energy is available to start the engine. Because the charge level of the two banks is different, the voltage level is also different. Therefore, the battery management controller logic circuit 66 commands the combination/separation device 61 to keep the two battery banks electrically separated and can monitor the voltage of each bank individually.

At the start up of the engine, a heavy electrical load is applied to the second bank 42 causing the voltage of the second bank 42 to drop. The amount of drop depends on the condition, the state of charge, and the temperature of the second bank 42 as well as the engine itself. Thus, there is a chance that under certain adverse conditions, the voltage drop will be so severe as to prevent the engine from starting unless additional electrical power is made available.

By monitoring the voltage of the first bank 40 separately from the second bank 42, and by monitoring the rate of charge of the voltage in the second bank 42 at the time the electrical load is applied at the engine start up cycle, the battery management controller logic circuit 66 can determine if additional electrical power is available in the first battery bank 40 to provide a starting boost. If the control algorithm in the battery management controller logic circuit 66 determines that such power is available, the logic circuit 66 will command the combination/separation device 61 to electrically combine the first battery bank 40 with the second battery bank 42 during the engine start up cycle. In this case, the engine starter 64 is connected to the combination of the first and second battery banks 40 and 42 through the combination/separation device 61 via the optional connection 65; thus allowing the engine to be started. After the engine is started, the battery management controller logic circuit switches to its charge mode algorithm as will be described next.

FIG. 6(*b*) is a flow chart showing the process for charging the batteries after the engine has been turned on. After the engine has started up at step 450, one or more power sources can be used to recharge the first and second battery banks 40 and 42. When the charging device 62 (such as the alternator) is activated at step 452, the battery management controller logic circuit 66 reviews the historical data from the last discharge cycle to estimate the amount of load that the recharging operation will be put on the charging device 62 at step 454. Previously entered user input from the user interface 51 will be used to determine if this estimated load is "high" or "low." A deeply discharged battery bank and/or large battery banks that contain a great deal of storage capacity are more likely to cause a "high" load than smaller or more lightly discharged batteries. Therefore, if the estimated load is determined to be "high," the battery management controller logic circuit commands the combination/separation device at step 456 to route the electrical power from the charging device 62 to only to the second battery bank 42 (i.e., the bank connected to the engine starter 64). Once the second bank has reach a state of charge sufficient to significantly reduce the load on the charging device 62, the control logic circuit commands the combination/separation device 61 at step 458 to electrically combine the first and second battery banks 40 and 42 so that all batteries get recharged. If, at the beginning of the recharge cycle, the battery management controller logic circuit determines that the load will be "low" then all batteries from both the first and second battery banks 40 and 41 are combined via the combination/separation device 61 and charged together at step 460. From either step 458 or step 460, the charging of both battery banks is continued until both are fully charged or the engine is turned off at step 462.

According to one embodiment of the present invention, so as to ensure that the batteries are fully recharged between cycles to prevent premature sulfation and destruction of the batteries, the battery management controller can also monitor and store the time and power levels of the batteries during the discharge and recharge cycles. This historical data can verify that, in a typical discharge and re-charge cycle, sufficient time and power is available to fully recharge the batteries. If there is not sufficient time and power to fully recharge, the control logic circuit 66 can respond by raising the minimum battery cut-off voltages thereby reducing the total amount of power which can be drawn from the battery banks. In other words, the battery management controller 60 can be configured to be self-learning which allows the controller to maximize the battery replacement life by monitoring the first and/or second power sources such that they are not excessively discharged (i.e., drained) and such that they are not discharged to a level that does not allow the power source to be fully recharged during the typical engine run time. For example, consider that a power source might be a battery in which the battery can be safely discharged to a level X. Thus, the level X can be the predetermined amount value during the determination of whether the power source should be connected to the HVAC system. However, if the run cycle of the engine was too short to allow the battery to fully recharge during the engine run after the battery had been partially discharged, the battery would still be prematurely destroyed because failure to fully recharge a battery is just as harmful as discharging it too deeply (or draining the charge too much). To prevent the premature destruction of a battery due to it not being fully recharged, the battery management controller 60 can monitor the battery charge in the power source to determine if the battery was fully recharged. If the battery was not, then the controller 50 can be configured to "learn" during the next operation where the power source is connected and the engine is turned off that the battery should be less deeply discharged, i.e., the battery should be discharged to a level Y, which is greater than the level X. Then, the level Y can be the predetermined amount value during the determination of whether the power source should be connected to the HVAC system.

Next, the power management controller 50 will be described. The power management controller 50 controls the components of the HVAC system 10, and works in conjunction with the battery management controller 60. The purpose of the power management controller 50 is to: (1) communicate to the user via the user interface; (2) monitor safety functions and initiate appropriate responses; (3) maximize the operational efficiency of the HVAC system by optimizing the speed of the condenser and evaporator fans and the speed of the compressor motor according to ambient conditions and user preferences; (4) regulate the speed of the condenser fans to control the condenser temperature thereby obtaining the best compromise between increased fan motor power consumption and increased compressor motor power; (5) regulate the speed of the evaporator fan proportionate to the temperature differential between the user temperature set point and the actual ambient temperature; and (6) regulate the speed of the compressor motor to maintain the desired evaporator temperature.

Figure 5B:
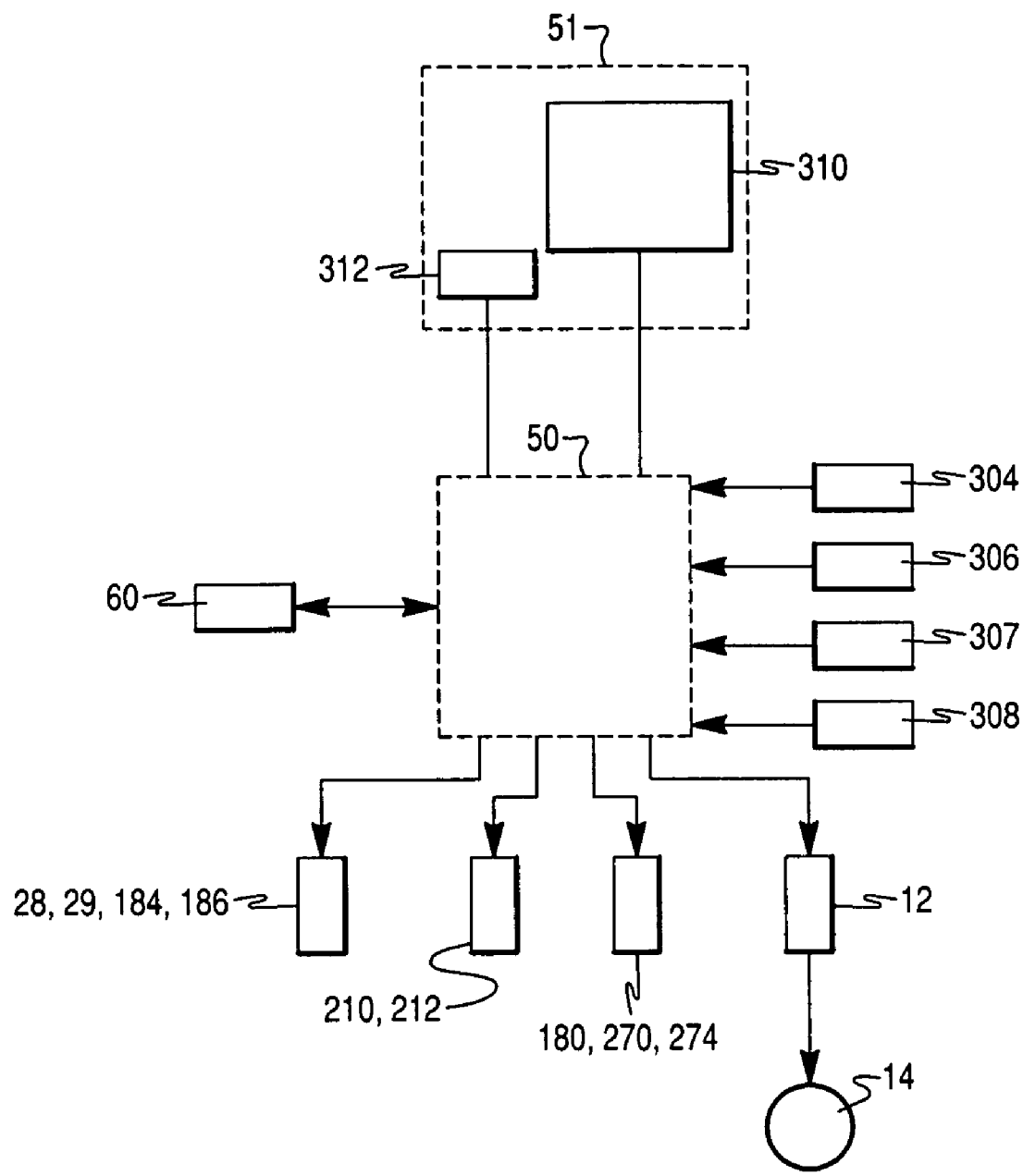

The power management controller 50 carries out its function by being operationally connected to the battery management controller 60, the user interface 51 (which includes a display 310 and one or more inputs 312), a plurality of sensors, and the operational components of the HVAC system as show in FIG. 5(*b*). The plurality of sensor detects a variety of parameters including: the vehicle's interior ambient temperature detected by a temperature sensor 304, the humidity of the vehicle's compartments by using a humidity sensor 307, and noise and/or vibration from one or more noise or vibration sensors 308.

As to the operational components of the HVAC system, the power management controller 50 can run the motor 12 that drives the compressor 14; the circulation blowers that blow the temperature-controlled air into one or more designated compartments (such as the vehicle compartment 23 and/or the sleeping compartment 27); the heaters for the heating system (such as the air heaters 272 and 274 from FIG. 1 or the heater 180 from FIG. 2); and the control doors (if applicable) for the regulation of the temperature. Additionally the power management controller 50 can also switch any control valves to control the flow of refrigerants (such as the valves 28 and 29 from FIG. 1 or the valves 184 and 184 from FIG. 2). In one embodiment, the motor 12 of the compressor 14 can be controlled by the power management controller 50 using a closed loop proportional, integral, derivative (PID) control. Similarly, the power management controller 50 can also control the fan speed of the circulation blowers 210 and 212 via a pulse width modulated (PWM) PID control loop that is independent of the control for the compressor.

In one embodiment, the power management controller 50 can modulate the speed of the motor 12, and thus can modulate the capacity of the compressor 14 driven by the motor 12. The modulation of the compressor can range between an upper compressor capacity and a lower compressor capacity. The compressor capacity can vary depending on the compressor capacity required to maintain the evaporator 22 or 26 at the evaporator temperature $T_E$ as commanded by the power management logic circuit 66.

In one exemplary embodiment of the present invention, the power management controller 50 ("PMC") can work as described below with reference to FIG. 7. The power management controller 50 receives a signal from the user interface 51 to begin operation at step 702. Commands are sent to the battery management controller 60 ("BMC") from the power supply management controller 50 to supply power to the HVAC system 10 at step 704. The user interface 51 is polled for the user preference settings, such as the mode of operation, the location of temperature control, and the desired set point temperature $T_{sp}$. Also the ambient temperature $T_a$ is read from the temperature sensor 304 at step 706.

If the user preference is for the "cooling" mode, the process is sent to step 708 where a command is issued to start all fans of the circulation blowers 210, 212 and the motor 12 of the compressor 14 to a minimum speed. At step 710, the compressor speed is then commanded to bring and hold the evaporator 22 to a predetermined evaporator temperature $T_E$ if the vehicle compartment is being cooled or to bring and hold the evaporator 26 to a predetermined evaporator temperature $T_E$ if the sleeping compartment is being cooled. At step 712, the fans of the condenser 16 are commanded to bring and hold the condenser 16 to a predetermined condenser temperature $T_C$.

If the user preference is for the "heating" mode, a command from the power management controller 50 is issued at step 714 to start the fans of the circulation blowers of the evaporator 22 or 26. The electric heating element 270 or 274 is commanded at step 716 to a power level (via PWM control) proportionate to the fan speed of the circulation blowers of the evaporator 22 or 26.

With the HVAC system 10 now running in either the heating or cooling mode, the battery management controller 60 is polled for an estimate of the run time based on the present power draw and stored energy available for use in step 718. As step 720, the estimated run time is compared to the desired run time which was programmed into the user settings by the user using the user interface 51. The power management controller factors the difference between the estimated and desired run times into planning the output of the HVAC system 10 to ensure that sufficient power is available for the duration of the heating or cooling period (also called the "run time plan"). Based on the run time plan, the power management controller 50 may increase or decrease the average capacity of the HVAC system periodically throughout the cycle. In particular, if the amount of heating (steps 726 and 736) or the amount of cooling (steps 726, 728, and 730) would require too much power to be drawn from the power source (s), the highest capacity of the HVAC system 10 possible would be employed which would still allow the battery management controller to supply power through the entire operational period. The highest capacity possible can be obtained through a combination of settings which would offer the best efficiency for the prevailing conditions.

At step 722, a variety of measurements are taken at step 722 so as to ensure that the HVAC system runs efficiently with its limited power supply. These measurements include the actual ambient temperature of the vehicle's interior $T_a$, the evaporator temperature $T_E$, and the condenser temperature $T_C$. At step 722, temperature sensors on the evaporator measure the evaporator temperature $T_E$, temperature sensors on the condenser measure the condenser temperature $T_C$, sensors in the vehicle and/or sleeping compartments measure the ambient temperature $T_a$, and the user inputs the desired ambient temperature or the set point temperature $T_{sp}$ via the user interface 51.

For efficient operation of the HVAC components in either the cooling or heating mode, a calculation is made at step 724 in which a difference $\Delta$ between the ambient temperature $T_a$ and the set point temperature $T_{sp}$ is determined. Then, the circulation blowers at the evaporator 22 or 26 are commanded to a speed proportionate to the difference $\Delta$ at step 726. The determination of an appropriate fan speed for the blowers at the evaporator based on a given $\Delta$ can be based on any one of a number of methods known in the art such as tabular formulations or computer models.

The air blown into the vehicle and/or sleeping compartments affects the ambient temperature of the compartment; thus with continued operation of the HVAC system, the difference ($\Delta$) between the ambient temperature $T_a$ and the set point temperature $T_{sp}$ begins to decrease. As the ambient temperature $T_a$ nears the set point temperature $T_{sp}$, the power management controller 50 reduces the fan speed of the circulation blowers at the evaporator 22 or 26 proportionately based on $\Delta$, as seen in step 726. If the system is in the cooling mode, the reduced air flow over the evaporator 22 or 26 causes the evaporator temperature $T_E$ to fall. In response, the power management controller 50 adjusts the speed of the motor 12 that drives the compressor 14 to maintain the desired evaporator temperature $T_E$ at step 728. Similarly, the changing capacity of the evaporator 22 or 26 also changes the temperature of the condenser $T_C$. Again, the power management controller 50 adjusts the fan speed of the condenser 16 so as to maintain the desired condensing temperature $T_C$ at step 730. However, the settings for the circulation blowers, the compressor, and the condenser (which are set in steps 726, 728, and 730 respectively) are subject to the highest possible capacity of the HVAC system based on the run time plan. Thus, if too much power would be drawn by these components while running at the most efficient operation, the settings of these components would be adjusted so as to allow the system to run for the desired run time while operating as close as possible to the most efficient operation determined by $\Delta$.

The process continues to step 732 where the power management controller receives data from the battery management controller 60 about whether there is sufficient power being supplied. If there is sufficient power (the "YES" path), the process returns to step 718 and the process is repeated. If there is insufficient power (the "NO" path), the operation of the HVAC system is terminated at step 734.

If the HVAC system is operating in heating mode rather than the cooling mode, the power management controller 50 alters the PWM cycle of the resistive heating elements 270 or 274 to match the changing fan speed of the circulation blower at the evaporator 22 or 26. In this way, the temperature of the discharged air remains constant. Thus, step 736 is carried out in FIG. 7 instead of steps 728 and 730. Similar with the cooling operation, the settings for the circulation blowers and the heater (which are set in steps 726 and 736 respectively) are subject to the highest possible capacity of the HVAC system based on the run time plan. Thus, if too much power is being drawn by these components while running at the most efficient operation, the settings of these components can be adjusted so as to allow the system to run for the desired run time while operating as close as possible to the most efficient operation determined by $\Delta$. For example, the settings of the circulation blowers may be lowered to a level that permits operation during the entire desired run time while still operating as close as possible to the settings for the most efficient operation based on $\Delta$.

Other system parameters can be used to control the motor-driven compressor 14 and the circulation blowers 210 and 212. For example, the power management controller 50 can also monitor humidity of the vehicle's compartments by using a humidity sensor 307. If the humidity of the compartments is above a predetermined threshold (which can be set by the vehicle occupant), the power management controller 50 can control the compressor 14 to speed up (up to but not exceeding the upper compressor capacity) and the circulation blowers 210 and 210 to slow down.

Furthermore, one or more noise or vibration sensors 308 can be used to determine the level of noise or vibration of the HVAC system 10. Once the signal is sent to the power management controller 50, the controller 50 determines whether there is a need to speed up or slow down the compressor and/or blower, and to control the compressor and/or blower accordingly.

The use of one or more system parameters, such as the evaporator temperature, the humidity, the exterior ambient temperature, the vehicle's interior temperature, etc. to control the compressor and blower capacities can be accomplished by monitoring the one or more system parameters and using a program in the power management controller 50 that was compiled using, for example, a multivariate model known in the art.

Other system parameters can also be provided to the power management controller 5, which may allow the power management controller 50 to detect faults within the HVAC system. For example, performance and safety functions are monitored and an appropriate response by the power management controller 50 can be initiated, such as shutting down the system in the event of the overheating of the motor 12 of the compressor 14.

FIG. 9 shows another embodiment of the HVAC system according to the present invention. The embodiment in FIG. 9 is similar to the embodiment of FIG. 1; however, FIG. 9 shows how the HVAC system can be divided up into a split system 600 in which there is an exterior subsystem 602 and an interior subsystem 604. The exterior subsystem 602 can comprise components that are located on the exterior of the vehicle's cab. The interior subsystem 604 can comprise components that are located in the interior of the vehicle's cab. For example, FIG. 9 shows an exterior subsystem 602 that comprises a motor 12, a compressor 14, a condenser 16, and a first power source, which are located outside the cab of a large vehicle, such as a truck. In addition, the second power source and the electrical power generation system 44 can also be located on the exterior of the vehicle's cab as is conventional with large vehicles.

The interior subsystem 604 can comprise the circulation blower 610, the evaporator 622 and the power management controller 50, the battery management controller 60, the display 310, and the input device 312, which are all located inside the cab of the vehicle. The temperature controlled air can be optionally channeled into ducts 672, which may split into two or more ducts that may lead to different compartments or areas of the interior of the vehicle's cab. In one embodiment, the ducts 672 can be the vehicle's own ducting which is already installed in the vehicle cab. Additionally, the interior subsystem 604 can comprise the vehicle's already existing evaporator 622 and circulation blower 610. In such a situation, the exterior subsystem 602 may be configured to be able to connect to a plurality of different evaporators, such as the vehicle's own evaporator. In addition, the exterior subsystem 602 may be configured to connect to a plurality of evaporators at one time, such as one evaporator for cooling/heating the driving compartment and one evaporator for cooling/heating the sleeping compartment.

In FIG. 9, the refrigerant metering device is located exterior to the vehicle's cab as part of the exterior subsystem 602, which allows the servicing of the metering device to be easier if it should fail. Alternatively, the refrigerant metering device 20 can be located in the interior of the cab as part of the interior subsystem 604.

The split system 600 has several advantages. First, less interior space is taken up by the system because a substantial portion of the components are located exterior to the vehicle's cab. Additionally, the vehicle's existing ducts can be used so that no additional ducting is needed. Thus, the system can have an easier installation process, improved efficiency, and quieter operation.

The disclosed battery management controller and HVAC system can provide temperature control to a vehicle occupant for extended periods of time when the vehicle's engine is not running. In addition, the system ensures sufficient battery power to start the vehicle even when the HVAC system has been running for a period of time when the engine has been turned off. The battery management and HVAC systems can be used in large trucks, such as 18 wheelers, as well as any other type of vehicle.

During operation, the power management controller 30 processes the user inputs to determine the operational mode of the HVAC system 10. When either the heating or cooling mode of operation is selected and when the engine is turned on, the vehicle electrical power generation system is used to power the necessary components. For example, the heater and circulation blowers are turned on during the heating mode of operation while the compressor, circulation blowers, and pumps are turned on during the cooling mode of operation.

When the heating mode is operating when the engine is turned off, the power management controller 50 commands a heater (such as the coolant heater 180 in FIG. 2 or the air heaters 270 and 274 in FIG. 1) and the circulation blowers 210 and 212 to turn on. The power management controller 50 also controls the speed of the circulation blowers 210 and 212 via a pulse width modulated (PWM) PID control loop in order to maintain the temperature of the driving and/or sleeping compartment at the interior set point temperature. With the various disclosed embodiments, the heating of the interior of the cab can be performed without relying on diesel fuel but can be run purely by battery power. Thus, the heating can be performed without relying on the vehicle's engine being turned on.

When the cooling mode of operation is used when the engine is turned off, the circulation blowers 210 and 212, the compressor 14 and/or the pump 176 are turned on. The power management controller 50 modulates the capacity of the compressor 14 and the circulation blowers 210 and 212 to maintain the temperature of the driving and/or sleeping compartment at the interior set point temperature via PID control.

In either the heating or cooling mode when the engine is turned off, if the voltage of the combination of the first and second power sources drops below a predetermined amount, the first and/or second power source is disconnected and the HVAC system is only powered by the remaining power source. Once the voltage of the remaining power source drops below another predetermined level, the battery management controller 60 can be configured to disconnect the remaining power source, thus shutting down the HVAC system 10.

Upon start up of the vehicle, the alternator or other charging device can be used to charge up the first and second power sources (if they are batteries) so that they are fully charged. In one embodiment of the present invention, the battery management controller 60 can also be used to connect the first power source (such as an auxiliary battery or bank of auxiliary batteries) during the start up of the vehicle in the situation where the second power source (such as the starter battery or bank of batteries) is too weak to start the vehicle, such as in the case where the starter battery is weakened because of very low exterior ambient temperatures.

Furthermore, the HVAC system can be a split system with a substantial portion of the components exterior to the vehicle's cab such that less interior space is taken up by the HVAC system. Also, the vehicle's existing evaporator and/or ducting can be used with the HVAC system for an easier installation process, improved efficiency, and quieter operation.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An HVAC system to be installed in a vehicle comprising:
    a battery management controller comprising:
    at least one connection for electrically coupling a first power source with a first voltage;
    at least one connection for electrically coupling a second power source with a second voltage;
    wherein the battery management controller is configured to run a temperature control system and to supply power to the temperature control system from a combination of the first and second power sources with a combined voltage, wherein the second power source is electrically separated when the combined voltage drops below a predetermined amount.

2. The HVAC system according to claim 1, wherein the second power source is at least one battery connected to an engine starter of the vehicle.

3. The HVAC system of claim 2, wherein the first power source is at least one auxiliary battery.

4. The HVAC system of claim 3, wherein the battery management controller is configured to gather historical data for any one of the at least one auxiliary battery and the at least one battery connected to the engine starter.

5. The HVAC system of claim 4, wherein the historical data is maximum or average battery discharge.

6. The HVAC system of claim 3, further comprising a display for showing current approximate battery charge of the at least one auxiliary battery or the at least one battery connected to the engine starter.

7. The HVAC system of claim 3, further comprising a combination/separation device configured to connect the at least one auxiliary battery to the engine starter to assist the at least battery connected to the engine starter during start up of the vehicle if the at least one battery connected to the engine starter is weakened such that the vehicle has difficulty starting.

8. The HVAC system of claim 1 further comprising: a first power source; a compressor; a motor operatively coupled to the compressor; and a condenser in fluid communication with the compressor.

9. The HVAC system of claim 8, wherein the first power source, the compressor, the motor, and the condenser are configured to be outside a cab of the vehicle as an exterior subsystem.

10. The HVAC system of claim 9, wherein the exterior subsystem is configured to connect to a plurality of evaporators at one time.

11. The HVAC system of claim 10, wherein the exterior subsystem is configured to connect to the vehicle's existing evaporator.

12. The HVAC system of claim 8, wherein the compressor is a stepless continuously variable speed compressor that is controlled by a power management controller.

13. The HVAC system of claim 8, further comprising an evaporator in fluid communication with the condenser and a circulation blower configured to flow air past the evaporator.

14. The HVAC system of claim 13, wherein the circulation blower is a stepless variable speed control that is controlled by a power management controller.

15. The HVAC system of claim 1, further comprising an electric resistance heater.

16. The HVAC system of claim 1, further comprising a reverse cycle heating system.

17. The HVAC system of claim 1, wherein the battery management controller is configured to recharge the first and second power sources by using a charging device.

18. The HVAC system of claim 17, wherein the battery management controller is configured to connect the first and second power sources to the charging device when the voltage of the first power source is above a predetermined level and to only connect the second power source to the charging device when the voltage of the first power source is below a predetermined level.

19. The HVAC system of claim 1, wherein the predetermined amount is an amount dynamically determined based on ambient operating conditions.

* * * * *

(12) EX PARTE REEXAMINATION CERTIFICATE (9450th)

United States Patent
Alston et al.

(10) Number: US 7,797,958 C1
(45) Certificate Issued: Dec. 19, 2012

(54) HVAC SYSTEM CONTROLLED BY A BATTERY MANAGEMENT SYSTEM

(75) Inventors: G. Kevin Alston, Oakland, CA (US); Machiko Taylor, Alameda, CA (US)

(73) Assignee: Crosspoint Solutions, LLC, Indianapolis, IN (US)

Reexamination Request:
No. 90/009,825, Sep. 21, 2010

Reexamination Certificate for:
Patent No.: 7,797,958
Issued: Sep. 21, 2010
Appl. No.: 11/560,160
Filed: Nov. 15, 2006

(51) Int. Cl.
*F25B 27/00* (2006.01)

(52) U.S. Cl. .............. 62/236; 62/243; 62/244; 165/43
(58) Field of Classification Search .................. None
See application file for complete search history.

(56) References Cited

To view the complete listing of prior art documents cited during the proceeding for Reexamination Control Number 90/009,825, please refer to the USPTO's public Patent Application Information Retrieval (PAIR) system under the Display References tab.

*Primary Examiner* — Robert M. Fetsuga

(57) ABSTRACT

An HVAC system for a vehicle. The HVAC system includes a battery management controller, which can be used to run the components of the HVAC system when the engine of the vehicle is not running.

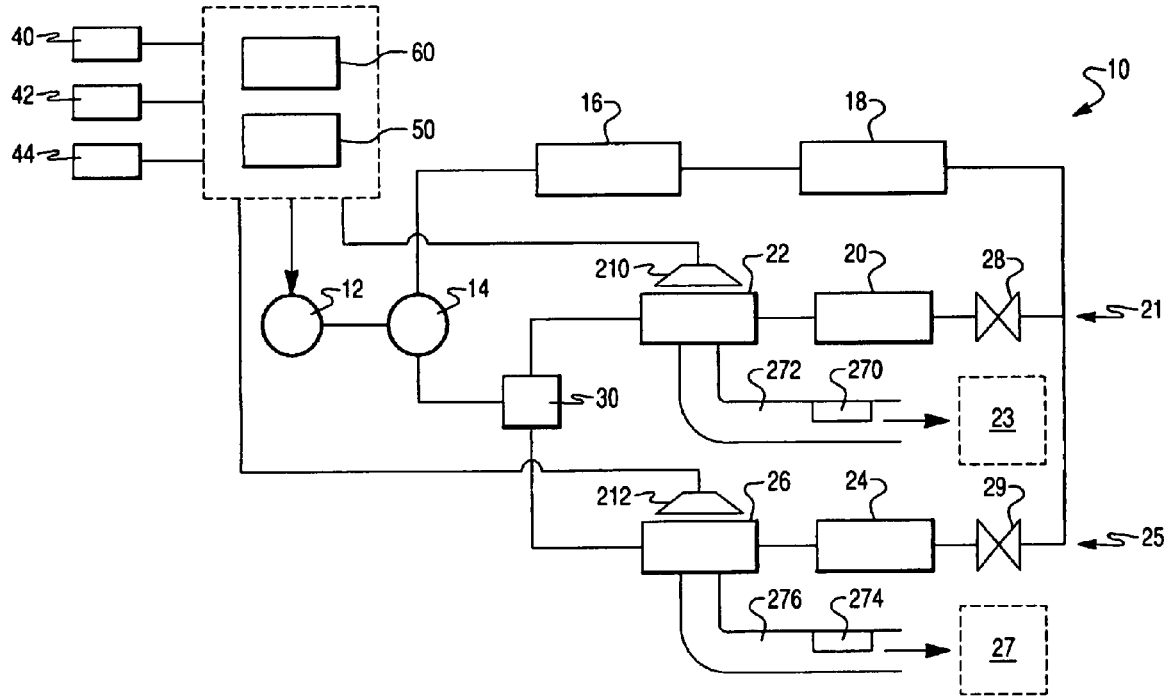

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 8 are determined to be patentable as amended.

Claims 2-7 and 9-19, dependent on an amended claim, are determined to be patentable.

New claims 20-31 are added and determined to be patentable.

1. An HVAC system to be installed in a vehicle *having an engine* comprising:
    a battery management controller comprising:
    at least one connection for electrically coupling a first power source with a first voltage;
    at least one connection for electrically coupling a second power source with a second voltage;
    wherein the battery management controller is configured to run a temperature control system *when the vehicle engine is off* and to supply power to the temperature control system *when the vehicle engine is off* from a combination of the first and second power sources with a combined voltage, wherein the second power source is electrically separated when the combined voltage drops below a predetermined amount.

8. The HVAC system of claim 1 further comprising: [a first power source;] a compressor; a motor operatively coupled to the compressor; and a condenser in fluid communication with the compressor.

*20. An HVAC system to be installed in a vehicle having an engine, wherein the configuration of the HVAC system includes powering the HVAC system solely by battery power when the engine is off, comprising:*
    *a battery management controller including at least one connection for electrically coupling a first battery having a first voltage and at least one connection for electrically coupling a second battery having a second voltage, wherein the first battery is an auxiliary battery connected to a temperature control system configured to provide temperature control for the vehicle when the engine is off and the second battery is connected to the engine starter;*
    *wherein the battery management controller is configured to run the temperature control system when the engine is off by supplying power from a combination of the first battery and the second battery which together have a combined voltage, and wherein the second battery is electrically separated from the first battery so that power to the temperature control system is only supplied by the first battery when the combined voltage drops below a predetermined amount.*

*21. The HVAC system of claim 20, wherein the battery management controller is configured to gather historical data for any one of the at least one auxiliary battery and the at least one battery connected to the engine starter.*

*22. The HVAC system of claim 21, wherein the historical data is maximum or average battery discharge.*

*23. The HVAC system of claim 20, further comprising a display for showing current approximate battery charge of the first battery or the second battery.*

*24. The HVAC system of claim 20, further comprising a combination/separation device configured to connect the auxiliary battery to the engine starter to assist the battery connected to the engine starter during start up of the vehicle.*

*25. The HVAC system of claim 20 further comprising: a compressor; a motor operatively coupled to the compressor; and a condenser in fluid communication with the compressor.*

*26. The HVAC system of claim 25, wherein the compressor, the motor, and the condenser are configured to be outside a cab of the vehicle as an exterior subsystem.*

*27. The HVAC system of claim 26, wherein the exterior subsystem is configured to connect to the vehicle's existing evaporator.*

*28. The HVAC system of claim 25, wherein the compressor is a stepless continuously variable speed compressor that is controlled by a power management controller.*

*29. The HVAC system of claim 25, further comprising an evaporator in fluid communication with the condenser and a circulation blower configured to flow air past the evaporator.*

*30. The HVAC system of claim 20, wherein the battery management controller is configured to connect the first and second batteries to a charging device when the voltage of the first battery is above a predetermined level and to only connect the second battery to the charging device when the voltage of the first battery is below a predetermined level.*

*31. The HVAC system of claim 20, wherein the predetermined amount is an amount dynamically determined based on ambient operating conditions.*

\* \* \* \* \*